United States Patent [19]

Naylor et al.

[11] Patent Number: 5,742,289
[45] Date of Patent: Apr. 21, 1998

[54] SYSTEM AND METHOD OF GENERATING COMPRESSED VIDEO GRAPHICS IMAGES

[75] Inventors: Bruce F. Naylor, Summit; Eric David Petajan, Watchung, both of N.J.

[73] Assignee: Lucent Technologies Inc., Murray Hill, N.J.

[21] Appl. No.: 689,962

[22] Filed: Aug. 16, 1996

Related U.S. Application Data

[63] Continuation of Ser. No. 221,732, Apr. 1, 1994, abandoned.

[51] Int. Cl.$^6$ .................................................. G06T 13/00
[52] U.S. Cl. ......................... 345/419; 345/473; 348/402
[58] Field of Search ............................ 395/152, 119, 395/173; 348/400, 401, 402, 407, 413, 414, 416, 417, 669; 345/419, 473

[56] References Cited

U.S. PATENT DOCUMENTS

| | | | |
|---|---|---|---|
| 5,144,423 | 9/1992 | Knauer et al. | 348/402 |
| 5,198,901 | 3/1993 | Lynch | 348/413 |
| 5,262,856 | 11/1993 | Lippman et al. | 348/416 X |
| 5,297,057 | 3/1994 | Kramer et al. | 395/152 X |
| 5,353,392 | 10/1994 | Luquet et al. | 395/152 X |
| 5,410,358 | 4/1995 | Shackleton et al. | 348/699 X |
| 5,453,789 | 9/1995 | Machida et al. | 348/400 |

FOREIGN PATENT DOCUMENTS

| | | | |
|---|---|---|---|
| 0577418 | 6/1993 | European Pat. Off. | H04N 7/137 |
| 0588653 | 9/1993 | European Pat. Off. | H04N 7/13 |

OTHER PUBLICATIONS

S. E. Chen, L. Williams, "View Interpolation for Image Synthesis", *Computer Graphics Proceedings*, Annual Conference Series, pp. 279-288, 1993.

B. K. Guenter, H. C. Yun, R. M. Mersereau, "Motion Compensated Compression of Computer Animation Frames", *Computer Graphics Proceedings*, Annual Conference Series, pp. 297-304, 1993.

H. Morikawa et al, "Image Sequence Coding Using 3-D Structure and Motion Information", *Systems and Computers of Japan*, vol. 22, No. 8, 1 Jan. 1991, pp. 87-95.

*Primary Examiner*—Mark K. Zimmerman

[57] ABSTRACT

In a hybrid system for synthesizing a compressed video bitstream from a dynamic 3-D model, the video bitstream represents an image sequence comprised of a plurality of image frames which are sequential in time and in which each image frame is partitioned into a set of regions. Motion vectors are generated for each region within a current image frame which represent the dynamic 3-D model. A prediction error is computed for each region based on the generated motion vectors. The type of encoding to be performed on each region in a succeeding image frame is determined based on the value of the prediction error. Each region in the succeeding image frame is encoded as indicated by the determined encoding type.

34 Claims, 4 Drawing Sheets

SYSTEM AND METHOD OF GENERATING COMPRESSED VIDEO GRAPHICS IMAGES

This application is a continuation of application Ser. No. 08/221,732, filed on Apr. 1, 1994 now abandoned.

BACKGROUND OF THE INVENTION

The present invention relates to computer graphics systems for generating video images.

Computer animation is a term used to describe any application in which a computer aids in the generation and manipulation of a sequence of changing images. Computer animation is widely used in industry, science, manufacturing, entertainment, advertising and education. Examples of computer animation applications are computer aided design (CAD), flight simulation and video games.

Certain high performance interactive graphics systems, such as computer workstations, flight simulators and other types of video systems, require complex three-dimensional (3-D) rendering programs to generate realistic two-dimensional (2-D) images of animated 3-D graphics scenes. Essentially, the task of a rendering program is to transform a 3-D geometric model, stored as a computational representation of objects, into a 2-D image displayable on a computer display.

The relative positions of image components create a perspective for the viewer, and the appearance of three dimensions. Successive 2-D image frames create the illusion of movement within the reproduced scene. Many times these 2-D images are used in applications which also require interactivity by the user. For many of these interactive applications, computer animation having real-time response is highly desirable.

For example, with the advent of interactive television systems comes the desire to provide services, such as video games, which allow the subscriber to interact with the system or other subscribers to the system. Because each subscriber can interact with the system independently from other subscribers, each subscriber's perspective of the generated image sequences is different. The subscriber's perspective may be dependent on factors, such as the position and direction of view in which a subscriber is looking, the type of screen on which the images are displayed, the degree of action portrayed by the images and the number of subscribers interacting with the particular application. As such, a separate set of video signals must be generated for each subscriber which accurately represents the particular subscriber's perspective of the images. Using current technology, a graphics generator and a separate video encoder would be used to generate each set of video signals.

The costs involved in providing each subscriber with his own graphics generator and video encoder are economically unattractive. Another concern is the latency of the system. Latency is the time required for the system to begin display of the desired video signal once the user input is received. Latency is caused by certain functions performed by the video encoder, such as motion approximation, prediction error computations, and buffer size requirements, which comprise a large percentage of the amount of time required to encode the images of the 3-D models. If the latency is too great, real time response is not possible. It would be desirable to reduce the latency and cost of the system by providing an interactive system which is capable of generating compressed video signals without requiring a separate graphics generator and video encoder for each subscriber.

SUMMARY OF THE INVENTION

The present invention is directed to such an interactive system. We have recognized that some of the rendering functions conventionally performed by a graphics generator and the encoding functions conventionally performed by a video encoder can be combined in a hybrid system which is capable of computing and encoding information during the rendering of the image frames needed to generate compressed video signals.

In accordance with the present invention, a hybrid system for synthesizing a compressed video bitstream from a dynamic 3-D model has been realized. The video bitstream represents an image sequence comprised of a plurality of image frames which are sequential in time and in which each image frame is partitioned into a set of regions. Motion vectors are generated for each region within a current image frame which represent the dynamic 3-D model. A prediction error is computed for each region based on the generated motion vectors. The type of encoding to be performed on each region in a succeeding image frame is determined based on the value of the prediction error. Each region in the succeeding image frame is encoded as indicated by the determined encoding type.

By determining the type of video encoding to be performed on each region within an image frame during the rendering of the region, the latency of the system is significantly reduced. The approximation techniques traditionally performed by the video encoder used to determine the type of encoding to be performed are computationally intensive. Since these computations are now part of the rendering process, the latency in the overall system is reduced, and more importantly, the overall system hardware complexity is also reduced which reduces the cost of the system.

The hybrid system also allows for the creation of a centralized interactive graphics system which is capable of remotely generating images of 3-D scenes on each viewer's screen. A centralized system also reduces costs by timesharing the hardware among all of the subscribers.

DETAILED DESCRIPTION

Figure 1:
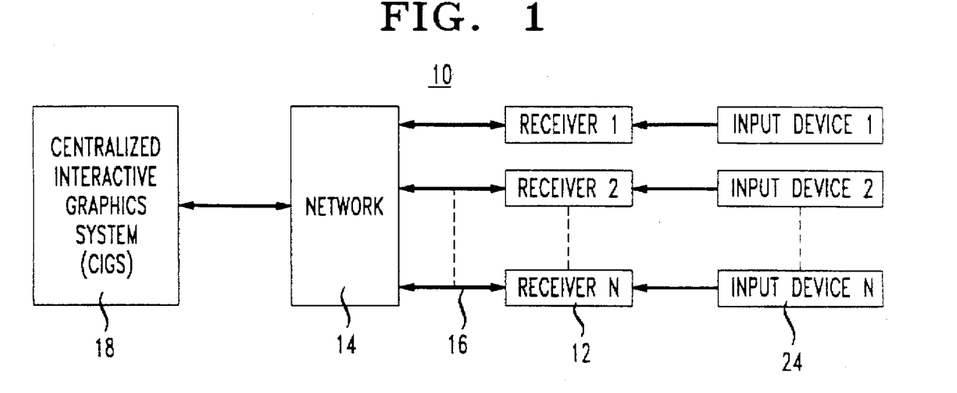
FIG. 1 illustrates a schematic diagram of a video system implemented in accordance with an illustrative embodiment of the present invention.

A general overview of a video system 10 incorporating the principles of an illustrative embodiment of the present invention is illustrated in FIG. 1. A plurality of display devices, illustratively television receivers 12, are connected to network 14 by means of a cable 16. A set-top box (not shown) may be associated with each television 12 for transmitting and receiving instructions via the network 14. A centralized interactive graphics system (CIGS) 18, also associated with network 14, is capable of generating computer graphics.

In operation, network 14 processes incoming requests from subscribers for services which may include interactive graphics services such as, for example, video games. The network 14 retrieves the requested video game from CIGS 18. The game is transmitted over cable 16 to the set-top box associated with the television receiver 12 of the subscriber requesting the video game. An input device 24, such as an air mouse, associated with each subscriber's television receiver 12 transmits instructions to the network 14 regarding the progression of the game.

Figure 2:
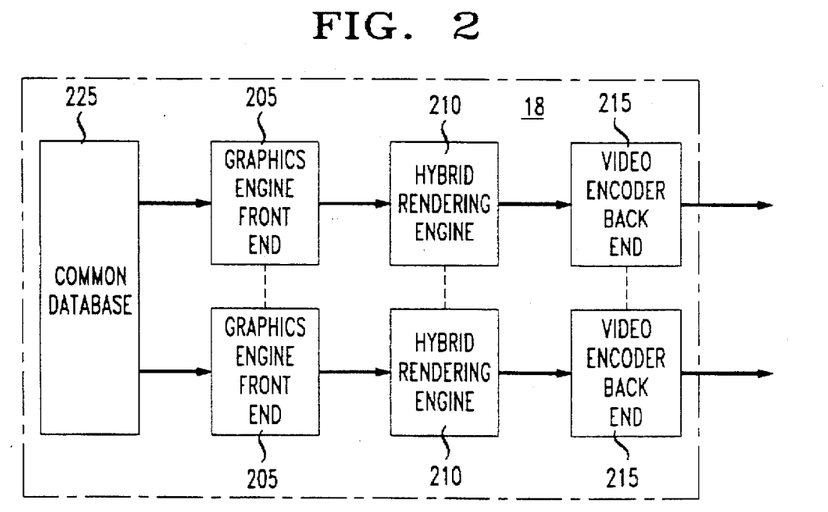
FIG. 2 illustrates a block diagram of the centralized interactive graphics system of FIG. 1.

FIG. 2 shows CIGS 18 in more detail. In a multiuser game, a common database 225 is shared among the users and changes to the database 225 by each user are incorporated into the common database 225. This view-independent processing is shared among the users to reduce cost and latency in contrast with updating separate databases for each user. CIGS 18 includes a graphics engine front end 205, a hybrid rendering engine 210 and a video encoder backend 215 for each user. The graphics engine front end 205 generates data structures required for creating a particular 3-D scene. Each data structure comprises a group of mathematically described objects which are defined by points, lines, polygons and three dimensional solids. Using techniques well known in the art, details relating to each object's shape, texture and color values can also be defined. Each object, in turn, is defined, relative to the other objects contained in the 3-D scene, by a matrix which includes information regarding rotation, scaling, shearing and translation. The processes performed by the graphics engine front end 205 are described in *Computer Graphics: Principles and Practice*, James D. Foley, et al., Addison Wesley, 1990.

The hybrid rendering engine 210 performs conditional rendering on the 3-D objects, that is, transforming the data representing 3-D objects to data representing 2-D images. The 2-D images are incorporated into an image sequence which is comprised of a plurality of successive image frames which represent an animated 3-D scene. Adjacent image frames tend to be highly correlated due to small changes in object position and camera position during one frame time. Each image frame is comprised of a plurality of subunits or pixels. Each image frame is also subdivided into a plurality of image blocks each containing a predetermined number of pixels, e.g., 16×16 pixels.

Motion vectors are generated for each image block which represent the projected direction of motion for any image of an object represented in the current image block and therefore predict the position of the image of the object in a subsequent image frame. Texture complexities which define spatial frequency energy associated with each region are also determined. The motion vectors and texture complexities for each image block are used to compute a prediction error which is accumulated over successive image frames. The prediction error is used to determine the type of encoding performed on each image block in successive image frames as will be described in detail hereinafter. Once the hybrid rendering engine 210 has determined the type of encoding to be performed on a successive image block, the decision is transmitted to the video encoder back end 215 which encodes the motion vector or image block and transmits the encoded motion vector or image block to the television receiver 12 of FIG. 1.

Figure 10:
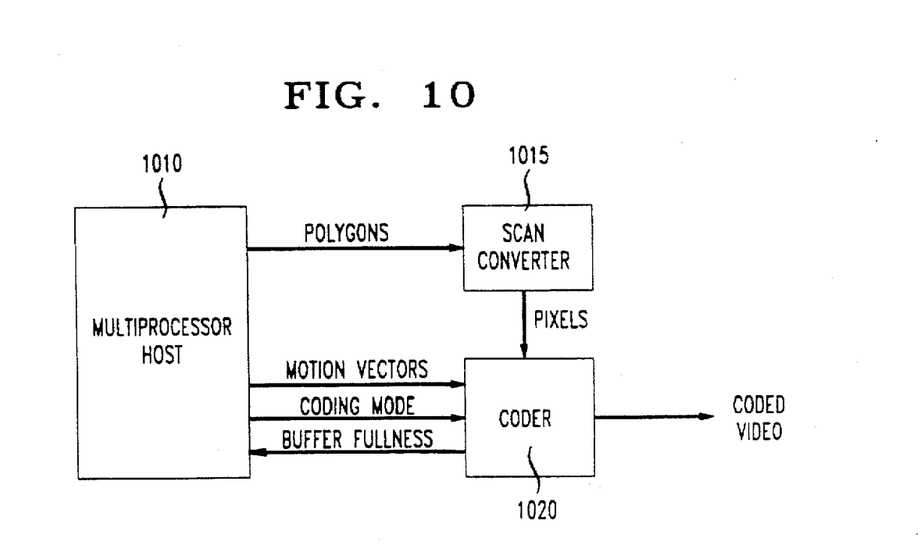
FIG. 10 illustrates a block diagram illustrating the computer architecture for the centralized interactive graphics system of FIG. 2.

The architecture for the system in FIG. 2 includes general and special purpose processors as illustrated in FIG. 10. Parallel general purpose processors are used to compute the model transformations, motion vectors, coding mode decisions and rate control parameters. High speed special purpose processors or ASIC's are used to perform scan conversion of textured polygons, DCT, DCT coefficient quantization and variable length coding, and data formatting of the coded video. The special purpose processing can reside on the system bus of a general purpose multiprocessor host computer 1010 with a separate digital video interface located between a scan converter 1015 and video encoder 1020.

Figure 3:
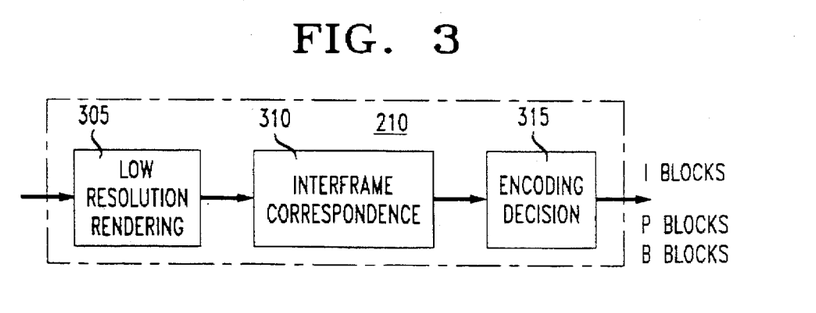
FIG. 3 illustrates a block diagram of the hybrid renderer engine of FIG. 2.
Figure 4:
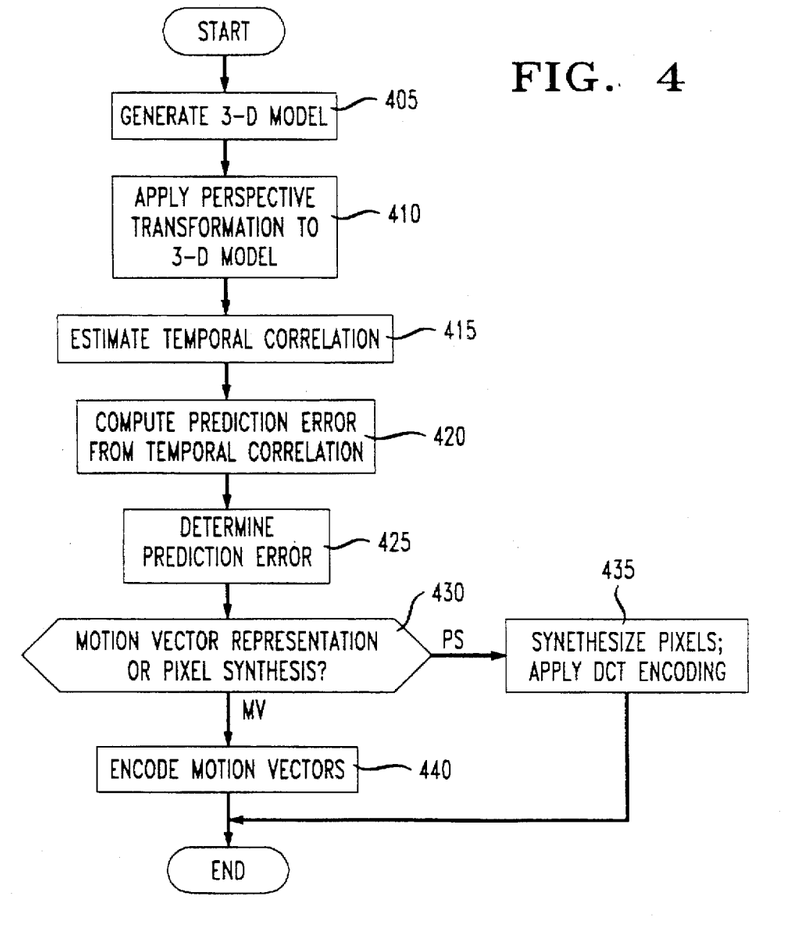
FIG. 4 is a flow chart illustrating the functions performed by the centralized interactive graphics system of FIG. 1.

Referring to FIGS. 3 and 4, the hybrid rendering engine 210 will be described in more detail. Low resolution rendering 305 is performed on the 3-D objects which includes applying a perspective transformation to the 3-D objects in which the objects undergo a series of mathematical transformations, as described below. The perspective transformation orients the objects in space relative to the viewer, scales the objects to the proper size, adjusts for perspective foreshortening, and clips the objects to the desired display volume (step 410). Also included in the transformations are surface details which simulate color and texture, and shading details to simulate reflections of light. By performing these transformations, a mapping definition is derived for each object to produce a 2-D image.

In general, each object, as defined by a given image frame, comprises a set of discrete points, each point comprising x,y,and z coordinates. Each image sequence represents the movement of objects in successive image frames. Prior to generating each successive image frame, a temporal interframe correlation 310 is determined with respect to the position of each object contained in a current image frame relative to its position in the previous image frame (step 415). The temporal correlation is determined by the motion of each of the objects and the interframe visibility of the object. The information obtained from the temporal correlations is used for the encoding decision 315 which will be described in detail hereinafter.

Intraframe visibility of an object depends firs fly upon whether there is an overlap of the x,y coordinate positions of the images of one or more objects within the image frame. If there is an overlap of the x,y coordinates, illustratively the position of the z coordinate for the image of each object is considered to determine the visibility of the images of each of the objects. In an image space representation, the z coordinate corresponds to depth. An image of an object having a greater z coordinate and, hence a greater depth, will be obscured by the image of an object having a smaller z coordinate if the images have overlap in x and y coordinates. In such a case, the image of the object having the smaller z coordinate at least partially blocks the view of the image of the other object. Alternatively, the objects can be drawn in a lower to higher priority ordering with higher priority objects being overwritten on lower priority objects. Generally higher priority objects represent "near" objects and lower priority objects represent "far" objects. Such a situation is illustrated in FIG. 5.

Figure 5:
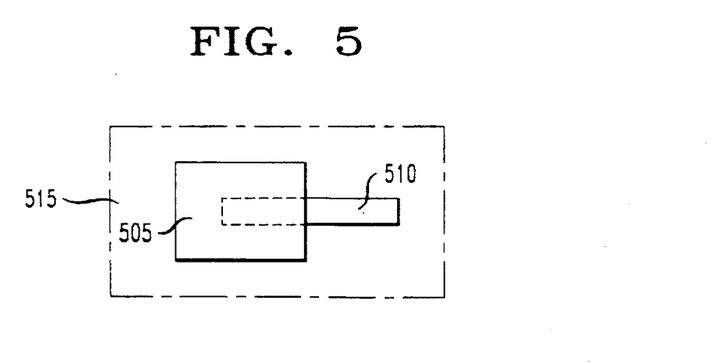
FIG. 5 illustrates two objects contained within a single image frame.

FIG. 5 illustrates images of two objects 505, 510 displayed within an image frame 515. Part of image 510 is illustrated by a dashed line to indicate that the view of image 510 is partially obstructed by image 505. The dashed line also signifies that while both image 505 and image 510 have the same x and y coordinates within that defined area, image 510 has a greater z coordinate than image 505.

Figure 6:
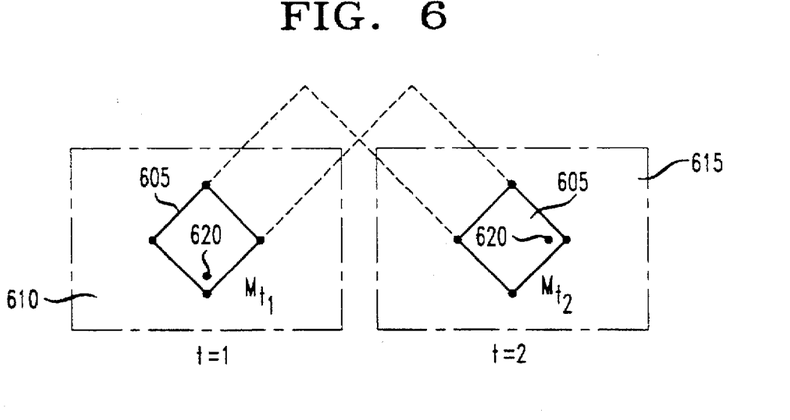
FIG. 6 illustrates a schematic diagram of sequential video frames on which temporal correlation measurements are performed.

FIG. 6 illustrates the motion of the image 605 of an object in two successive image frames 610, 615. A matrix $Mt_1$ is used to represent the position of the image 605 in the first frame 610 at time t=1. A second matrix $Mt_2$ is used to represent the position of the image 605 in the second frame 615 at time t=2. Each matrix defines the transformation of the original object with respect to rotation, translation, scaling and shearing. A surface point 620 of the image 605 in the second frame 615 is correlated to the frame position in the first frame 610. A determination is made of whether the surface point 620 is positioned in the same corresponding frame position in the first frame 610 using the following equation:

$$P_{t1} = proj\ [P_{t2}\ (M_{t2}^{-1})\ M_{t1}] \tag{1}$$

where $P_{t1}$=surface point of image at t=1

$P_{t2}$=surface point of image at t=2

$M_{t2}^{-1}$=inverse of matrix used to represent image at t=2.

$M_{t1}$=matrix used to represent image at t=1.

proj=division by homogeneous coordinate W

Interframe visibility is an important component in determining temporal correlation. Interframe visibility is confirmed if an ID number associated with $P_{t1}$ equals an ID number associated with $P_{t2}$. If the surface point 620 is the same thereby signifying movement of an object 605, the difference in x and y coordinate position is determined. The temporal correlation of a number of surface points contained in frame 615 relative to corresponding surface points contained in frame 610 are determined in the same manner.

If a portion of an image of an object is visible in the current image frame but obstructed in the previous image frame, temporal correlation of the surface points is not defined. In such a case, the pixels representing that portion of the image would soon have to be synthesized from the original 3-D model to avoid visible error. However, in the case where an image of an object is visible both in the current image frame and the previous image frame, the movement of the image in a subsequent image frame can be approximated using motion vectors (step 420). Motion vectors can be generated from the temporal correlations for each surface point of the image. The motion vectors approximate the direction and rate of movement in a subsequent image frame.

Model motion vectors are generated for each image block by sampling a number of the pixels contained in the block for a given image frame. The image block is illustratively a 16×16 pixel block. If the model motion vectors indicate that the image block represents a homogeneous region, i.e., that the model motion vectors are generally pointing in the same direction, the model motion vectors are averaged and the dominant vector, also referred to as the block-based motion vector, is used to represent the block. The number of pixels sampled in each block is determined by balancing considerations of computational efficiency and block-based motion vector accuracy.

Figure 7:
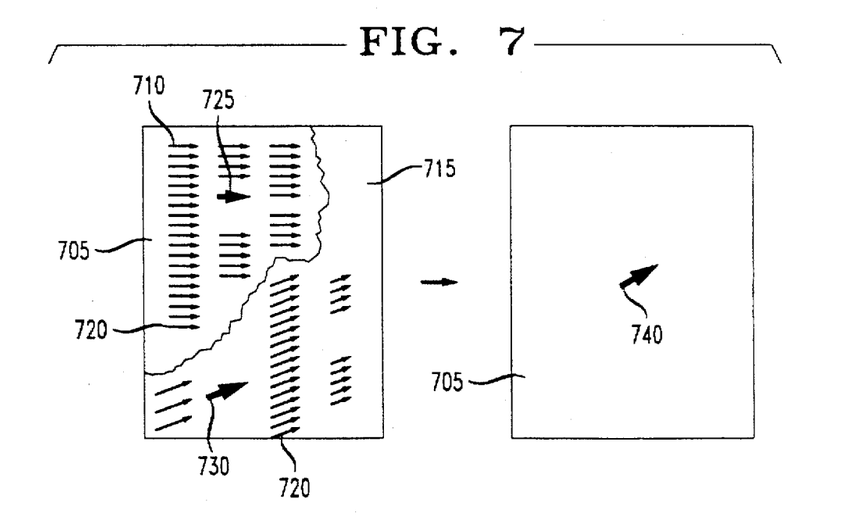
FIG. 7 illustrates a pair of sequential image blocks and the model motion vectors and block-based motion vector associated therewith.

As illustrated in FIG. 7, if model motion vectors 720 for an image block 705 indicate that the block 705 contains more than one homogeneous region 710 and 715, the model motion vectors 720 are weighted based on the size of each region 710 and 715 and the texture complexity in each region 710 and 715 using the following relationship:

$$S_r = \Sigma(A_r \times T_r \times M_r) \tag{2}$$

where $S_r$=score for region r $A_r$=area of region r $T_r$=texture complexity associated with each region r $M_r$=degree of motion vector similarity within region r $$= 2|MV_{x_{max}}| + 2|MV_{y_{max}}| - \sum_{\begin{pmatrix} model \\ motion \\ vectors\ in \\ region \end{pmatrix}} (|MV_{region_x} - MV_{model_x}| + |MV_{region_y} - MV_{model_y}|)$$

The model motion vectors 720 for each region 710 and 715 are averaged to obtain a region motion vector 725 and 730. A score $S_r$ is obtained for each region motion vector 725 and 730 using the above equation. The region motion vector within the 16×16 block which receives the highest score is determined to be the block based motion vector 740.

Figure 8:
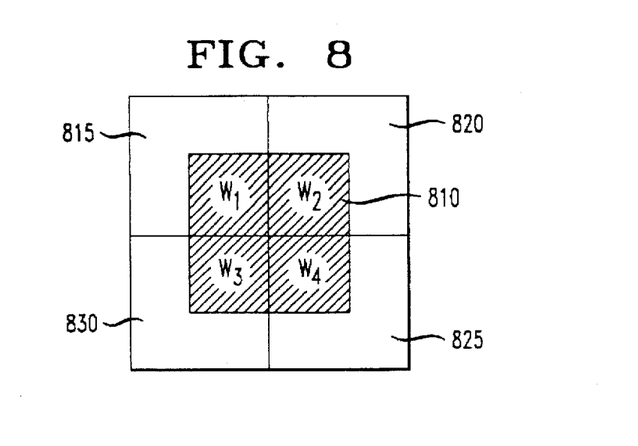
FIG. 8 illustrates an overlay of a current image block over a section of four image blocks from a previous image frame.

Once the block based motion vectors are generated for each image block contained in the image frame, a prediction error is computed for each block from the block based motion vector error (step 425 of FIG. 4). The prediction error for each block is computed based on the following relationship:

$$PE_b = \sum_{\begin{pmatrix} model \\ motion \\ vectors\ in \\ block \end{pmatrix}} (T_r \times |MV_{model_x} - MV_{block_x}| + |MV_{model_y} - MV_{block_y}|) \tag{3}$$

where $PE_b$=prediction error for a given block $T_r$=texture complexity of region r $MV_{model}$=model motion vector $MV_{block}$=value of block-based motion vector Typically, an image block for a current image frame overlaps four image blocks of a previous image frame as illustrated in FIG. 8. Current image block 810 overlaps previous image blocks 815, 820, 825 and 830. In order to determine the accumulated prediction error for current image block 810, a weight $w_1$, $w_2$, $w_3$ and $w_4$ is associated with the portion of the current image block 810 overlapping previous image blocks 815, 820, 825 and 830 respectively. The prediction error $p_1$, $p_2$, $p_3$ and $p_4$ computed for each previous image block 815, 820, 825 and 830 is multiplied by the respective weight to determine the prediction error for the current image block 810 in the following manner:

$$P_i = w_1 p_1 + w_2 p_2 + w_3 p_3 + w_4 p_4 \tag{4}$$

where $P_i$=prediction error for current image block $w_1+w_2+w_3+w_4=1$ (normalized)

The total prediction error for the image block 810 in the current image frame is the sum of $P_i$ and $PE_b$.

As successive image frames are generated, the prediction errors for each image block are accumulated. If the accumulated prediction error for a given image block is below a predefined threshold, the block based motion vector for that image block is transmitted to the video encoder back end 215 of FIG. 2 which constructs the image block from the block based motion vector as described below (step 440 of FIG. 4). If the accumulated prediction error is above the predetermined threshold, the next image block is generated by the video encoder back end 215 which encodes the block as described below (step 435). In this case, the prediction error for this block is set to zero for the purpose of prediction error accumulation in the next frame.

In preferred embodiments, the video encoder back end 215 follows the MPEG (Coding of Moving Pictures and Associated Audio) standard which is well known in the art and is described in Video Draft Editing Committee, "Generic Coding of Moving Pictures and Associated Audio," Recommendation H.262, *ISO/IEC* 13818-2, Committee Draft for Video, Seoul, November 1993 and "ISO CD 11172-2: Coding of Moving Pictures and Associated Audio for Digital Storage Media at up to about 1.5 Mbits/s," November 1991. The MPEG standard encoding incorporates predictive encoding techniques which include the use of both intrablock and interblock coding techniques in combination with the discrete cosine transform, adaptive coefficient quantization, run length encoding and statistical or Huffman encoding. Intrablock encoding does not use temporal prediction (motion compensation) but only uses information contained in the current frame to encode a given image block. Interframe encoding is the generation of encoded block data from, for example, the differences between information from a current source block and a block predicted from prior blocks. The MPEG standard incorporates two basic types of interblock encoding. The first develops predictive blocks, referred to as "P" blocks, from the current block and a prior block. The second develops bidirectionally predictive blocks, referred to as "B" blocks, from the current block and a prior or a subsequent block. Blocks which are intrablock encoded are referred to as "I" blocks. Other types of predictive encoding techniques may be employed by the video encoder back end 215 without departing from the scope and spirit of the present invention.

In accordance with the present invention, the MPEG encoding is determined on a block by block basis, where each block has the dimensions of 16×16 pixels. As such, I blocks, P blocks, and B blocks can be generated based on the prediction error determination of the graphics generator. When the accumulated prediction error falls below the threshold as described above, the current block is copied from the previous frame using the block based motion vector. In the case of B blocks, the motion vector can refer to a past or future frame, or both with averaging. Accordingly, the video encoder back end 215 generates P block or B blocks based on the transmitted motion vectors. When the accumulated prediction error is above the threshold, the video encoder back end generates an I block and the accumulated prediction error is set to zero.

The rate at which I-blocks are generated is limited by the capacity of the renderer and by the maximum bit-rate allowed for the transmission of coded video. This necessitates the use of a rate control mechanism which limits the number of I-blocks per frame. Typically the I-block rate is periodically monitored during a frame time and the PE threshold is adjusted to achieve a target I-block rate. The I-block rate and threshold are further adjusted down and up respectively if the coded video buffer becomes too full.

Figure 9:
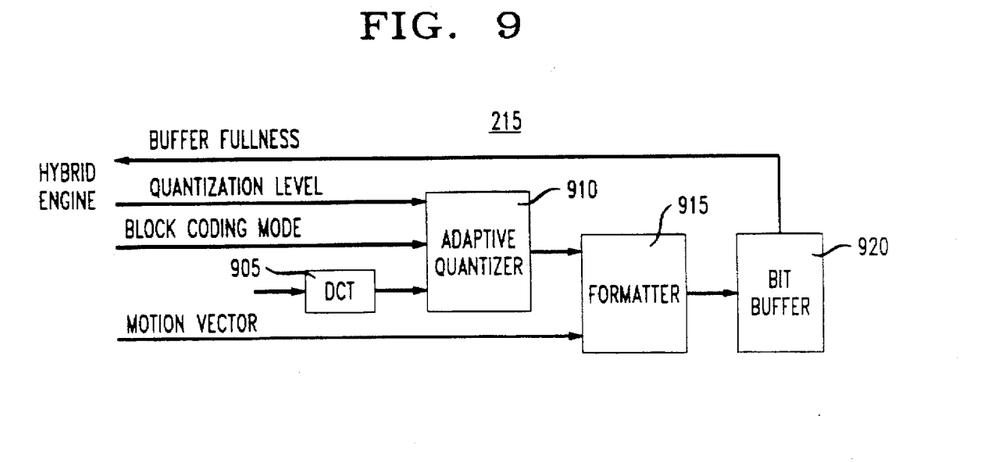
FIG. 9 illustrates a block diagram of the video encoder of the video system of FIG. 1.

FIG. 9 illustrates the video encoder back end 215 of FIG. 2 in more detail. The video encoder back end 215 generally performs the same encoding functions as is performed in a conventional video encoder once the encoding type decision for each image block has been determined. A discrete cosine transform (DCT) circuit 905 develops sets of 8×8 frequency domain coefficients. Adaptive quantizer 910 quantizes the transformed coefficients. A formatter 915 performs variable length encoding of the generated DCT coefficients thereby producing variable length encoded codewords. The codewords are then formatted with the appropriate header information in order to facilitate decoding by the receiver. The motion vector information is also received by the formatter 915. The coded data is transmitted to bit buffer 920 which transmits the encoded data to television receiver 12. Each of the elements of the video encoder back end 215 are described more fully in commonly assigned U.S. Pat. No. 5,144,423 issued to Knauer et. al. on Sep. 1, 1992, and incorporated herein by reference.

Additional coding and rendering efficiency can be obtained by approximating the effect of changes in illumination or shading, or partial occlusion of a region with a partially transparent object. Changes in shading can be approximated by adding or subtracting from the lowest order or 0,0 DCT coefficient for a given block of luminance DCT coefficients. Changes in the color of illumination require that both luminance and chrominance 0,0 coefficients be offset. The effect of this is to offset the average value of the corresponding blocks of pixels. The effect of partial occlusion by a non-textured and partially transparent object can be approximated by applying an offset to both luminance and chrominance 0,0 DCT coefficients.

By determining the type of video encoding to be performed on each region within an image frame during the rendering of the legion and using block-based motion vectors to compute prediction error, the latency of the system is significantly reduced. The approximation techniques traditionally performed by the video encoder used to determine the type of encoding to be performed are computationally intensive. Since these computations are now part of the rendering process, the latency in the overall system is reduced, and more importantly the overall system hardware complexity is reduced which lowers the cost of the system.

It will be appreciated that those skilled in the art will be able to devise numerous and various alternative arrangements which, although not explicitly shown or described herein, embody the principles of the invention and are within its scope and spirit.

We claim:

1. A hybrid system for synthesizing a compressed video bitstream from a dynamic 3-D model said video bitstream representing an image sequence comprised of a plurality of image frames which are sequential in time, each image frame being partitioned into a set of nonoverlapping contiguous regions, each block of said image frame being encoded as indicated by a predictive encoding type, the system comprising:

means for performing low resolution rendering upon the 3-D objects which compose the 3-D model to derive a mapping definition for each object and to thereby produce a 2-D image frame and to partition each image frame of a time sequence of frames into a set of regions;

means for generating motion vectors for at least one region within a current image frame, said motion vectors representing a projected direction of motion for the dynamic 3-D model;

means for computing a prediction error value for said at least one region based on the generated motion vectors;

means for determining a type of predictive encoding to be performed on said at least one region in a succeeding image frame based on the value of the prediction error; and means for encoding said at least one region in the succeeding image frame as indicated by the determined predictive encoding type.

2. The system according to claim 1 wherein said at least one region is a rectangular block and wherein said step of generating motion vectors for each at least one rectangular block comprises:

means for receiving a dynamic 3-D model;

means for computing model motion vectors from the dynamic 3-D model for each block within a current image frame; and means for generating block-based motion vectors for each block of the image frame, said block-based motion vectors approximating said model motion vectors.

3. The system according to claim 2 wherein the model motion vectors are sampled at a resolution lower than the display resolution.

4. The system according to claim 3 wherein said means for generating said block-based motion vectors to approximate the model motion vectors further comprises:

means for determining a weighted average of the model motion vectors contained within each block of the image frame; and means for representing the weighted averaged model motion vectors by a single block-based motion vector.

5. The system according to claim 4 wherein the weighted averaging of the model motion vectors within a given block is a function of the area and texture complexity of each region within the block having homogeneous motion.

6. The system according to claim 2 wherein said predictive encoding type includes predictive interblock encoding.

7. The system according to claim 6 wherein said predictive interblock encoding is bidirectional.

8. A method of synthesizing a compressed video bitstream from a dynamic 3-D model, said video bitstream representing an image sequence comprised of a plurality of image frames which are sequential in time, each image frame being partitioned into a set of non-overlapping contiguous regions, each block of said image frame being encoded as indicated by a predictive encoding type, the method comprising the steps of:

performing low resolution rendering upon the 3-D objects which compose the 3-D model to derive a mapping definition for each object and to thereby produce a 2-D image frame;

partitioning each image frame of a time sequence of frames into a set of regions;

generating motion vectors for at least one region within a current image frame, said motion vectors representing a projected direction of motion for the dynamic 3-D model;

computing a prediction error value for said at least one region based on the generated motion vectors;

determining a type of predictive encoding to be performed on said at least one region in a succeeding image frame based on the value of the prediction error; and encoding said at least one region in the succeeding image frames as indicated by the determined predictive encoding type.

9. The method according to claim 8 wherein said at least one region is a rectangular block, and wherein the step of generating motion vectors for each at least one rectangular block of a current image frame comprises the steps of:

receiving a dynamic 3-D model;

generating block-based motion vectors for each block of the image frame, said block-based motion vectors approximating said model motion vectors.

10. The method according to claim 9 wherein said step of generating the block-based motion vectors to approximate the model motion vectors comprises the steps of:

determining a weighted average of the model motion vectors contained within each block of the image frame; and representing the weighted averaged model motion vectors by a single block-based motion vector.

11. The method according to claim 10 wherein said predictive encoding type includes predictive interblock encoding.

12. The method according to claim 11 wherein said predictive interblock encoding is bidirectional.

13. The method according to claim 11 further comprising the steps of:

computing prediction errors associated with each block-based motion vector; and accumulating the prediction errors over a plurality of image frames.

14. The system according to claim 13 wherein said encoding means further comprises:

means for comparing said accumulated prediction errors to a threshold; and means for synthesizing a block associated with a particular accumulated prediction error if the particular accumulated prediction error exceeds the threshold.

15. The system according to claim 14 further comprising:

means for controlling a rate at which the block is synthesized by adjusting the threshold.

16. A system for synthesizing an image sequence from a dynamic 3-D model, said image sequence comprised of a plurality of image frames which are sequential in time, each image frame being partitioned into a set of contiguous rectangular blocks, the system comprising:

means for receiving a dynamic 3-D geometric model;

means for performing low resolution rendering upon the 3-D objects which compose the 3-D model to derive a mapping definition for each object and to thereby produce a 2-D image frame and to partition each image frame of a time sequence of frames into a set of regions;

means for computing model motion vectors from the dynamic 3-D model;

means for approximating said model motion vectors using block-based motion vector; and means for accumulating the prediction errors over a plurality of image frames.

17. The system according to claim 16 wherein the model motion vectors are sampled at a resolution lower than the display resolution.

18. The system according to claim 17 wherein said means for approximating model motion vectors further comprises:

means for determining a weighted average of model motion vectors contained within each block of the image frame; and means for representing the weighted averaged model motion vectors by a single block-based motion vector.

19. The system according to claim 18 wherein the weighted averaging of the model motion vectors within a given block is a function of the area and texture complexity of region within the block having each homogeneous motion.

20. The system according to claim 16 wherein said accumulating means further comprises:

means for determining an area-weighted average of the prediction errors for each block.

21. The system according to claim 20 further comprising:

means for approximating a change in illumination of a given block by adjusting a set of 0,0 DCT coefficients.

22. The system according to claim 20 further comprising:

means for approximating a partial occlusion of a block with a partially transparent nontextural block by adjusting a set of 0,0 DCT coefficients.

23. A method of synthesizing an image sequence from a dynamic 3-D model, said image sequence comprised of a plurality of image frames which are sequential in time, each image frame being partitioned into a set of contiguous rectangular blocks, the method comprising the steps of:

receiving a dynamic 3-D geometric model;

performing low resolution rendering upon the 3-D objects which compose the 3-D model to derive a mapping definition for each object and to thereby produce a 2-D image frame;

partitioning each image frame of a time sequence of frames into a set of regions;

computing model motion vectors from the dynamic 3-D model;

approximating the model motion vectors using block-based motion vectors, said approximation comprising the steps of:

determining a weighted average of model motion vectors using block-based motion vectors, said approximation comprising the steps of:

determining the weighted average of model motion vectors contained within each block of the image frame; and representing the weighted averaged model motion vectors by a single block-based motion vector.

24. The method according to claim 23 further comprising the steps of:

computing prediction errors associated with each block-based motion vector, and accumulating the prediction errors over a plurality of image frames.

25. The method according to claim 24 wherein said step of accumulating prediction errors further comprising the step of:

determining an area-weighted average of the prediction errors for each block.

26. The method according to claim 25 further comprising the step of:

approximating a change in illumination of a given block by adjusting a set of 0,0 DCT coefficients.

27. The method according to claim 25 further comprising the step of:

approximating a partial occlusion of a block with a partially transparent nontextural block by adjusting a set of 0,0 DCT coefficients.

28. The method according to claim 27 further comprising the steps of:

determining a type of predictive encoding to be performed on each block in succeeding image frame based on a prediction error value; and encoding each block in the succeeding image frame as indicated by the determined predictive encoding type.

29. The method according to claim 28 further comprising the steps of:

comparing said accumulated prediction errors to a threshold; and synthesizing a block associated with a particular accumulated prediction error if the particular accumulated prediction error exceeds the threshold.

30. The method according to claim 29 further comprising the step of:

controlling a rate at which the block is synthesized by adjusting the threshold.

31. A method of synthesizing a compressed video bitstream from a dynamic 3-D model, said video bitstream representing an image sequence comprised of a plurality of image frames which are sequential in time, each image frame being partitioned into a set of contiguous rectangular blocks, the method comprising the steps of:

receiving a dynamic 3-D geometric mode;

performing low resolution rendering upon the 3-D objects which compose the 3-D model to derive a mapping definition for each object and to thereby produce a 2-D image frame;

partitioning each image frame of a time sequence of frames into a set of regions;

computing model motion vectors from the dynamic 3-D model;

approximating model motion vectors using block-based motion vectors;

computing prediction errors associated with each block-based motion vector;

accumulating the prediction errors over a plurality of image frames;

comparing said accumulated prediction errors to a threshold;

synthesizing a block associated with a particular accumulated prediction error if the particular accumulated prediction error exceeds the threshold;

generating a block associated with a particular accumulated prediction error which is less than the threshold from a block from a previous image frame; and transmitting the synthesized blocks to a video encoded.

32. The system according to claim 31 further comprising:

means for controlling a rate at which the block is synthesized by adjusting the threshold.

33. A centralized interactive graphics system, comprising:

a common database of dynamic 3-D images shared among users so that changes to the database by each user are incorporated into the common database;

a plurality of graphics engine front ends connected to receive 3-D image data from said common database and to generate data structures for creating a particular 3-D scene;

respective hybrid rendering engines connected to said graphics engine front ends to perform low resolution rendering and to determine whether an image block within an image frame is to be encoded as a motion block or an image vector and the type of encoding to be used for said data structures; and respective video encoder back ends connected to said hybrid rendering engines to encode the motion vector or the image block and transmit the encoded motion vector or the image block.

34. The graphics system of claim 33, wherein said hybrid rendering engine comprises:

means for performing low resolution rendering upon the 3-D objects which compose the 3-D model to derive a mapping definition for each object and to there by produce a 2-D image frame and to partition each image frame of a time sequence of frames into a set of regions;

means for generating motion vectors for at least one region within a current image frame, said motion vectors representing a projected direction of motion for the dynamic 3-D model;

means for computing a prediction error value for said at least one region based on the generated motion vectors;

means for determining a type of predictive encoding to be performed on said at least one region in a succeeding image frame based on the value of the prediction error; and means for encoding said at least one region in the succeeding image frame as indicated by the determined predictive encoding type.

* * * * *